United States Patent [19]

Roberts et al.

[11] Patent Number: 4,496,801

[45] Date of Patent: Jan. 29, 1985

[54] SPLICING MODULE TEST SET

[75] Inventors: Thomas P. Roberts, San Jose; Albert R. Howard, Sunnyvale; James B. Hutchison, Mountain View, all of Calif.

[73] Assignee: Western Progress, Inc., Sunnyvale, Calif.

[21] Appl. No.: 433,720

[22] Filed: Oct. 12, 1982

[51] Int. Cl.³ ............................................. H04B 3/46
[52] U.S. Cl. ...................... 179/175.3 R; 179/175.3 A; 324/66
[58] Field of Search ..................... 179/175.1 R, 175.11, 179/175.2 R, 175.25, 175.2 C, 175.3 R, 175.2 D, 175.3 A, 18 AB, 98; 324/66

[56] References Cited

U.S. PATENT DOCUMENTS

4,186,283  1/1980  Simmonds ................... 179/175.3 R

Primary Examiner—Stafford D. Schreyer
Attorney, Agent, or Firm—Flehr, Hohbach, Test, Albritton & Herbert

[57] ABSTRACT

A splicing module test set for determining correct connections of new subscriber line connections to existing subscriber lines in a telephone system, including those systems with special service telephone lines. The test set provides an indication to a craftsperson that a proper and correct connection has been made to the new subscriber line without interrupting existing subscriber service, said lack of interruption being particularly important for special telephone lines.

13 Claims, 13 Drawing Figures

AUTO MODE DIFFERENTIAL AMPLIFIER

SPLICING MODULE TEST SET

BACKGROUND OF THE INVENTION

The present invention relates to a splicing module test set for use in a telephone system.

When extending or modifying telephone service, it becomes necessary to frequently splice pairs of telephone lines. In order to facilitate identification of pairs ready for transfer, telephone lines were originally joined one wire at a time. With present day advances, utilizing a modular connector, up to 25 pairs can be transferred at one time.

However, it is still necessary to insure that the connections have been in fact connected properly, e.g., tip-tip and ring-ring connections are connected properly. Prior art systems have generally utilized a manual checking of proper voltages (including visual checking of meters) to insure that a proper connection had in fact been established. A problem with the prior art is that the verification of proper ring-tip connections could result in interruption of subscriber service.

This is particularly true where the verification is for "special" circuits those telephone services other than plain old telephone services (POTS)—which cannot tolerate any type of interruption of telephone service.

Prior art techniques can introduce the element of human error when checking for proper ring tip connections, particularly for facilities utilizing complex telephone switching apparatus, such as a private branch exchange (PBX). It would be a desirable feature to obviate the need for manually checking the proper connection of a spliced pair, thereby reducing or eliminating any human error element, particularly with the telephone lines known as "special" lines. In view of the above background, it is an objective of the present invention to provide an improved splicing test set.

SUMMARY OF THE INVENTION

The present invention relates to a splicing module test set for use in a telephone system.

In order to facilitate proper connection of subscriber line pairs, the present invention provides means for automatically verifying the connections of the spliced pairs, including "special line pairs".

In one embodiment of the present invention, the foregoing objective is achieved by providing a pair of electronically isolated ohmmeters (one for each tip-tip and ring-ring connection) to "measure" the resistance between those respective connections while not affecting the "special" services. In an automatic mode, the foregoing objective is achieved by temporarily loading a working subscriber line not in use with a suitable resistance load such that the subscriber service is not disturbed. A value of approximately 12.1K ohms has been found to be the smallest resistance that can be utilized safely in the subscriber test set in order to provide a load which is not sufficient to signal off hook in the central office yet is enough loading to distinguish the loaded pair from all others.

In accordance with the above summary, the present invention achieves the objective of providing an improved splicing module test set.

Other objects and features of the present invention will become apparent from the following detailed description when taken in conjunction with the accompanying drawings.

DETAILED DESCRIPTION OF THE DRAWINGS

Figure 1:
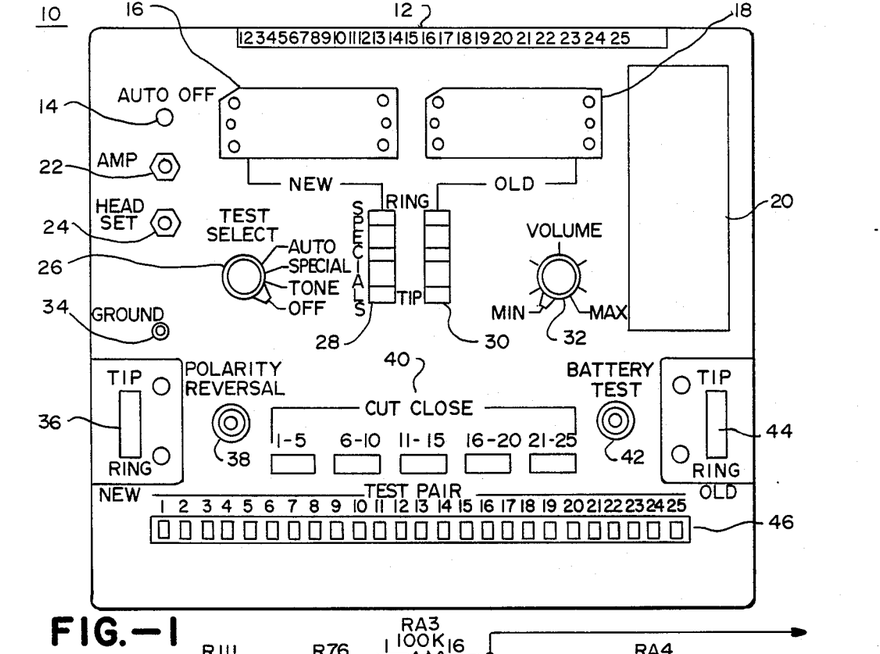
FIG. 1 depicts a diagram of a front face plate of a splicing module test set according to the present invention.

FIG. 1 depicts a diagram of a front face place of a splicing module test set 10 according to the present invention. The splicing module test set provides an immediate and rapid means of electronically verifying central office half taps and half taps at half tap splices that are terminated in a modular splicing system.

The test set 10 rapidly verifies pairs, whether vacant, idle, or in use by means of a simplex tone, thereby eliminating any possibility of interrupting subscriber service. The craftsperson utilizing the test set does not waste valuable time manually verifying pairs both old and new that are fault free and may be cut. The unit, electronically, by means of the internal audible tone, verifies the pair. If no tone is heard, no cut should be made.

The test set 10 detects, by means of a "no-tone", all standard cable faults such as opens, grounds, polarity reversals, shorts, transpositions, and splits, including tip splits on ESS and #5 Cross Bar where the tips are grounded on idle working lines.

The "Special" function of the test set 10 gives the added ability to test and verify most Specials, Ground-Start, and Vacant circuits that have been half-tapped. These and all circuits may be individually "CUT-CLOSED" Tip to Tip and Ring to Ring by depressing the five "CUT-CLOSE buttons on the front panel of FIG. 1.

Module access shoes may be used for pairs that have been previously terminated in a modular splicing connector. This enables the craftsperson to simultaneously access both the "new" and "old" pair by simply depressing the appropriate test pair switch on the test set 10.

A filtered 147 type amplifier is formed by a Probe Amplifier, a Tone Input and Audio Amplifier, and a Speaker Amplifier in combination, can also be incorporated into the test set 10 which is useful for pair identification (especially in pulp cable) and for locating faults such as opens, splits, crosses, punch backs, etc. A head set is not required, as the tone is heard from an internal speaker of the test set 10.

When not dedicated to a modular splicing system, the test set may be utilized as a standard tone transmitting instrument, complete with simplex tone and volt-meter. In addition, the test set 10 can be used as a 25 pair access switch in conjunction with external testing apparatus which individually accesses particular pairs ("new" and "old") terminated in a modular connector or central office main frame connector. This rapidly facilitates fault location.

In FIG. 1, a designation strip 12 is numbered 1 through 25. When telephone line pairs appear nonsequentially in a module, a randomly numbered tagging strip from the module may be removed and positioned directly beneath this numbered area for easy identification.

Auto-off switch 14 automatically turns the unit "off" to preserve battery life.

A Cinch-Jones connector 16 provides access through a cutter-presser head or module access cords to the "new" twenty five pairs terminated in the module. The Cinch-Jones connector 18 provides access to the "old" twenty five pairs terminated in the module.

The battery compartment 20 provides sufficient storage space for the equivalent of three 9-volt batteries. An amplifier jack 22 is for a standard 147B type amplifier probe which can be inserted to activate an internal amplifier for pair identification purposes.

A head set jack 24 provides an input for a standard head set with a phone plug, which may be inserted into jack 24 for use in high noise locations.

A test select switch 26 selects between "auto", "special", or "tone" modes, as will be described.

Meter 28 indicates voltage and polarity for any particular pair in the "new" module through a cutter-presser head, or a twenty-five pair access cord.

Meter 28 shows the line status of the pair being tested and indicates the status of special circuits.

Meter 30 indicates voltage and polarity for the particular pair in the "old" modules through a twenty five pair module access cord. Meter 30 shows the line status of the pair being tested and can also be used for battery test purposes.

Volume control 32 adjusts the volume of the signal applied to the speaker.

New tip and ring external access binding posts 36 accesses any particular pair in the "new" twenty five pair complement being tested for further fault locations as needed. Binding posts 36 also provide means for transferring one pair at a time and for tone transmission.

Polarity reversal switch 38 momentarily reverses the polarity of the "new" pair to further verify connection of pairs with polarity reversals.

Cut-close switches 40 when depressed, individually bridge the "old" to the "new" pairs, tip to tip and ring to ring, in modules of five.

Battery test switch 42 momentarily determines the condition of the batteries in the compartment 20 by means of an "old" meter 30.

"Old" tip and ring external access binding posts 44 accesses any particular pair in the "old" twenty five pair complement being tested for further fault location. Binding posts 44 also provide means for transferring one pair at a time.

Test pair switch 46 allows selection of any particular pair in the "new" and "old" modules. Switch 46 provides for selection of any pair in a random manner, which can easily be achieved by random depressing of the pushbuttons indicated in switch 46.

Figure 2:
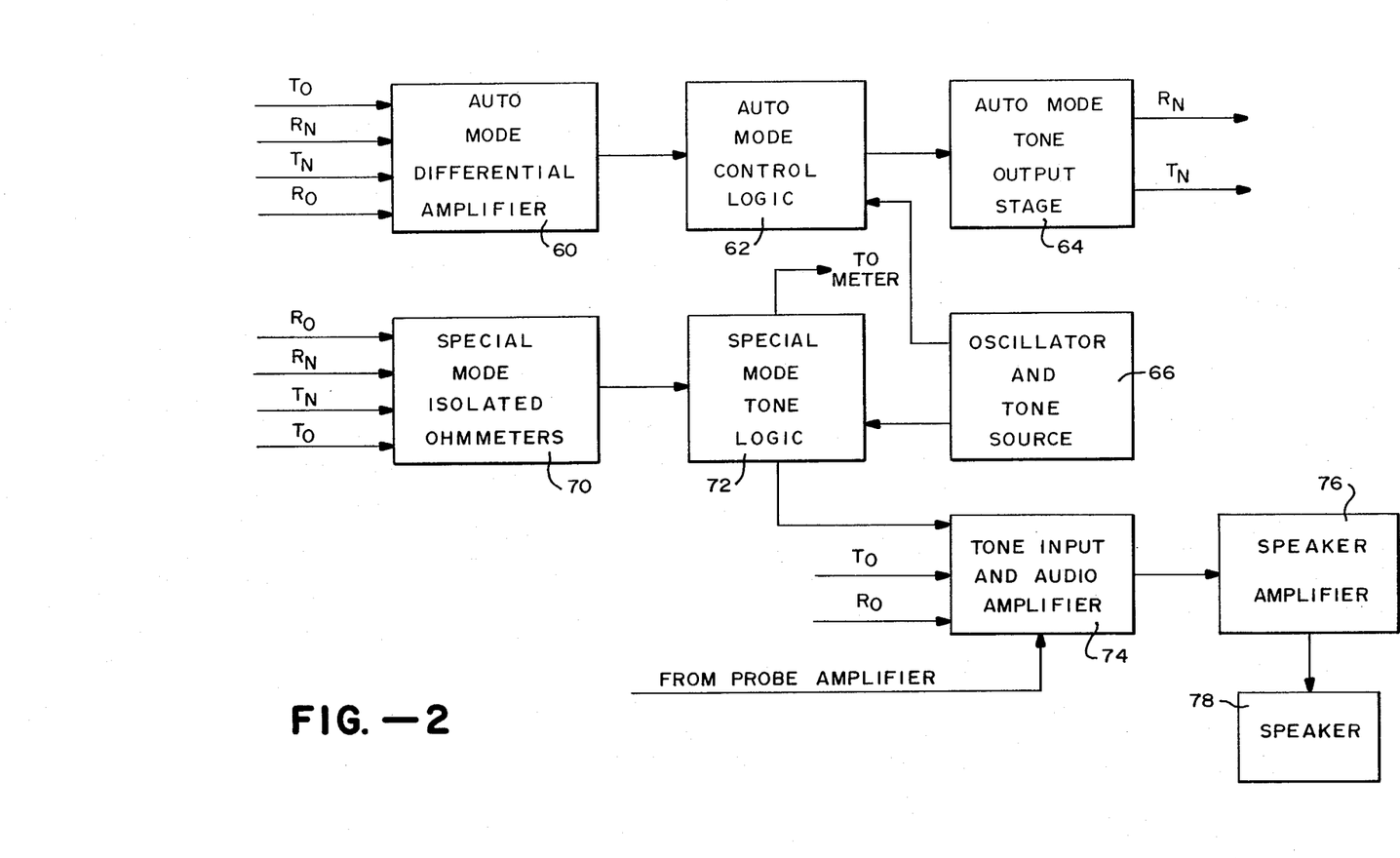
FIG. 2 depicts a block diagram of a splicing module test set according to the present invention.

Referring now to FIG. 2, a block diagram of the improved splicing module test set 10 of FIG. 1 according to the present invention is depicted.

In FIG. 2, auto mode differential amplifier 60 is connected to receive input lines $T_O, R_N, T_N, R_O$, for generating control signals for connection to auto mode control logic 62. The output of auto mode control logic 62 is connected to auto mode tone output stage 64 which also receives an input from oscillator and tone source circuit 66, which typically is a 500 Hz simplex tone (inaudible to a subscriber). The output of auto mode tone output stage 64 is connected to the $R_N$ and $T_N$ lines previously identified.

Still referring to FIG. 2, special mode isolated ohmmeter circuit 70 is connected to receive the $R_O R_N T_N$ and $T_O$ lines previously described. Special mode ohmmeter circuit 70 essentially acts as an ohmmeter in that it is designed to work only when the resistance introduced into the circuit between $T_O$ and $T_N$, and between $R_O$ and $R_N$, respectively, is approximately five thousand ohms or less.

The special mode isolated ohmmeter circuit 70 includes identical ohmmeters for the respective tip-tip and ring-ring connections. The output of isolated ohmmeter circuit 70 is connected to special mode tone logic 72, which in turn connects its output to meter 28 of FIG. 1. Another output of special mode tone logic circuit 72 is connected to the tone input and amplifier circuit 74, which also receives inputs from the $T_O$ and $R_O$ lines.

An additional tone input amplifier is from the optional probe amplifier (not shown) which provides necessary amplification for situations where a probe is necessary with the disclosed test set.

The output of tone input and amplifier circuit is connected to a speaker amplifier 76 which in turn connects to a conventional audio speaker 78 the necessary tone signals. Speaker 78 will generate an audible 500 Hz tone to enable a craftsperson to "know" when a proper connection is available.

Figure 3:
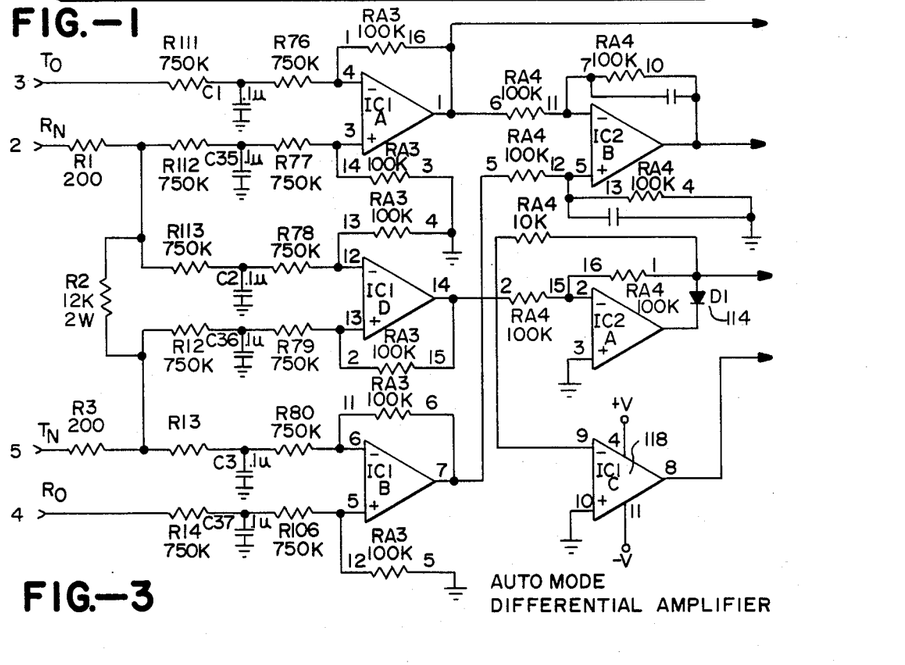
FIG. 3 depicts a schematic diagram of an auto mode differential amplifier, which forms a portion of FIG. 2.

FIG. 3 depicts in schematic detail the auto mode differential amplifier 60 of FIG. 2.

In FIG. 3, the auto mode differential amplifier 60 measures differential voltages from metallic subscriber pairs (those supplied with central office battery between tip and ring). The auto mode differential inputs $T_O R_N T_N$ and $T_O$ are connected to a telephone line in an auto (automatic) mode.

Differential amplifiers 102, 104 and 106 (each with its associated components) are typically a portion of a quad operational amplifier such as National Semiconductor's LM 324. The voltage at the output of amplifier 102 is, 1/15 ($V_{RN} - V_{TO}$).

The gain for $V_{TO}$ is 1/15 and is determined by resistors R111, R76 and RA3 (1-16), while the gain for $V_{RN}$ is +1/15 and determined by all six resistors.

Each amplifier 102, 104, 106 has a DC input resistance of 1.5M ohms at each input. Because the output of the amplifier must reflect the DC condition of the telephone line, capacitors C1 and C35 bypass any audio signals to ground. Therefore the AC input impedance seen at either input is 750K ohms.

The voltage at the output of amplifier 106 is 1/15 $V_{RN} - V_{TN}$, the voltage at the output of amplifier 104 is 1/15 ($V_{RO} - V_{TN}$), and the voltage at the output of amplifier 102 is 1/15 ($V_{RN} - V_{TO}$).

Each amplifier has a gain of approximately 1/15 because voltages up to 60 volts or more are encountered in the telephone network, while the internal circuitry typically will handle approximately 4, −2.5 volt signals at minimum battery voltages.

R2 is a 12K ohm resistor used to create a slight current flow through the new pair (out of $T_N$ and back into $R_N$).

The outputs of amplifiers 102, 104 are supplied to differential amplifier 110, which has a gain of 1 set by the four elements identified as RA4. Thus the output of amplifier 110 equals $1/15 (V_{RO} - V_{TN}) - 1/15 (V_{RN} - V_{TO})$.

Amplifier 112 is a full wave rectifier with a gain of 1 for either positive or negative input signals. When the input is positive, the output of amplifier 112 goes negative turning on diode 114. Feedback via resistance RA4 (16-1) establishes a gain of 1 which is set by resistance RA 4 (16-1) and RA4 (2-15). When the input to amplifier 112 goes negative, the output of amplifier 112 will go to the positive rail, biasing off diode 114. The signal is supplied to the output by resistor R4, resulting in a gain of +1. Therefore the signal on the anode of diode 114 has magnitude $(1/15) (V_{RN} - V_{TN})$ and is always less than or equal to zero (i.e., negative).

Figure 4:
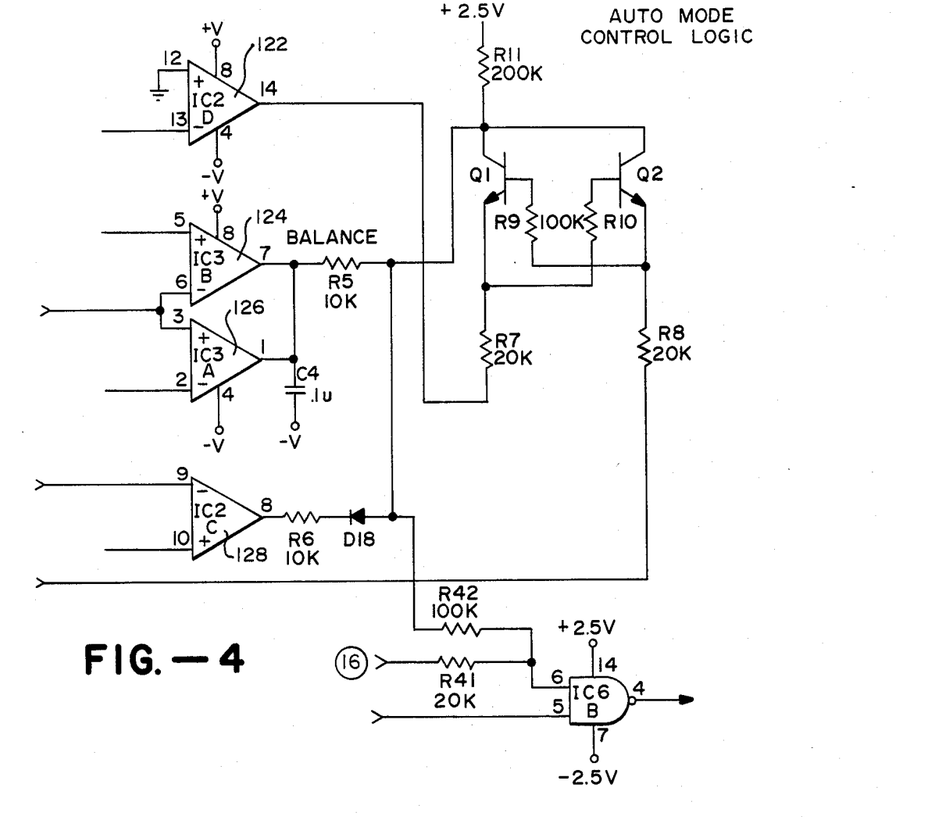
FIG. 4 depicts a schematic diagram of auto mode control logic, which forms a portion of FIG. 2.

FIG. 4 depicts a schematic diagram of the auto mode control logic 62, which forms a portion of FIG. 2.

In FIG. 4, the control logic 62 receives four input signals from the auto mode differential amplifier 60 of FIG. 3 and makes a "decision" based on those input signals to determine whether or not the old and new pairs being measured constitute a good half-tap.

Comparators 122 and 126 compare the inputs with reference voltages from an appropriate voltage divider network of +33 millivolts and −33 millivolts, respectively, and both receive as an input the output of amplifier 110 of FIG. 3.

Comparator 128 is referenced to −144 millivolts and is connected to receive as an input the output from amplifier 112 of FIG. 3.

The auto mode control logic 62 also receives as an input a tone signal from oscillator and tone source circuit 66. The tone signal is connected to NAND gate circuit 132 which is NANDed with the signals generated by comparators 124-128 to form an enable signal for connection to auto mode tone output stage 64.

The control signal generated by amplifiers 118-128 is illustrated by Chart I below:

CHART I

| Output | Signal |
|---|---|
| (122) | =1 if $(V_{RN} - V_{TO}) < 0$ |
|  | =0 if $(V_{RN} - V_{TO}) > 0$ |
| (118) | =1 if $(V_{RN} - V_{TN}) < 0$ |
|  | =0 if $(V_{RN} - V_{TN}) > 0$ |
| (128) | =1 if $(V_{RN} - V_{TN}) > 2.2v$ |
|  | =0 if $(V_{RN} - V_{TN}) < 2.2v$ |
| (124, 126) | =1 if $[(V_{RO} - V_{RN}) + (V_{TO} - V_{TN})] < .5v$ |
|  | =0 if $[(V_{RO} - V_{RN}) + (V_{TO} - V_{TN})] > .5v$ |
| 122 $\overline{XOR}$ 128 | =1 if $[(V_{RN} - V_{TO}) < 0] \wedge [(V_{RN} - V_{TN}) < 0]$ |
|  | =1 if $[(V_{RN} - V_{TO}) > 0] \wedge [(V_{RN} - V_{TN}) > 0]$ |
|  | =0 if $[(V_{RN} - V_{TO}) < 0] \wedge [(V_{RN} - V_{TN}) > 0]$ |
|  | =0 if $[(V_{RN} - V_{TO}) > 0] \wedge [(V_{RN} - V_{TN}) < 0]$ |
| Output or "control signal" | (122 $\overline{XOR}$ 118) $\wedge$ 128 $\wedge$ 124 $\wedge$ 126 |

As indicated in Chart I above, the outputs of comparators 118-126 are a "1" or a "0" under circumstances, depending upon the voltages $V_{RN}$, $V_{TO}$, $V_{RO}$, $V_{TN}$. Hence, the final enable output to NAND gate 130 will only occur when the final logic indication occurs as set forth in Chart I. This enable signal will enable a craftsman to audibly register, as will be described, a indication of a proper connection.

Figure 5:
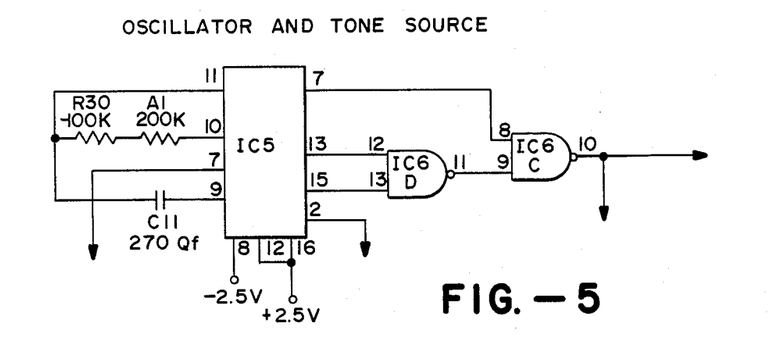
FIG. 5 depicts a schematic diagram of an oscillator and tone circuit, which forms a portion of FIG. 2.

Referring now to FIG. 5, the oscillator and tone source circuit 66 of FIG. 2 is depicted as a schematic diagram. The oscillator circuit 66 generates the 500 Hz test tone. Oscillator circuit in FIG. 5 includes a CMOS oscillator/divider chain 140. Resistors R30 and A1 and capacitor C11 determine the oscillator frequency from oscillator/divider circuit 140. Resistor A1 is used to set the frequency on pin 7 to 500 Hz. Gate 142 combines the frequencies of divider 140, pins 13 and 15 to create a 2 Hz, 75% duty cycle gating waveform. Gate 144 gates the 500 Hz signal with this waveform to create a distinctive beeping tone ("beeble"). Counter 140 also supplies the 500 Hz signal to run the isolated DC to DC converter for the special mode isolated ohmmeters to be described below.

The output of oscillator circuit 66 is connected to auto mode control logic 62 and gated in gate 130 for connection to the auto mode tone output stage 64 of FIG. 2.

Figures 6, 7, 9:
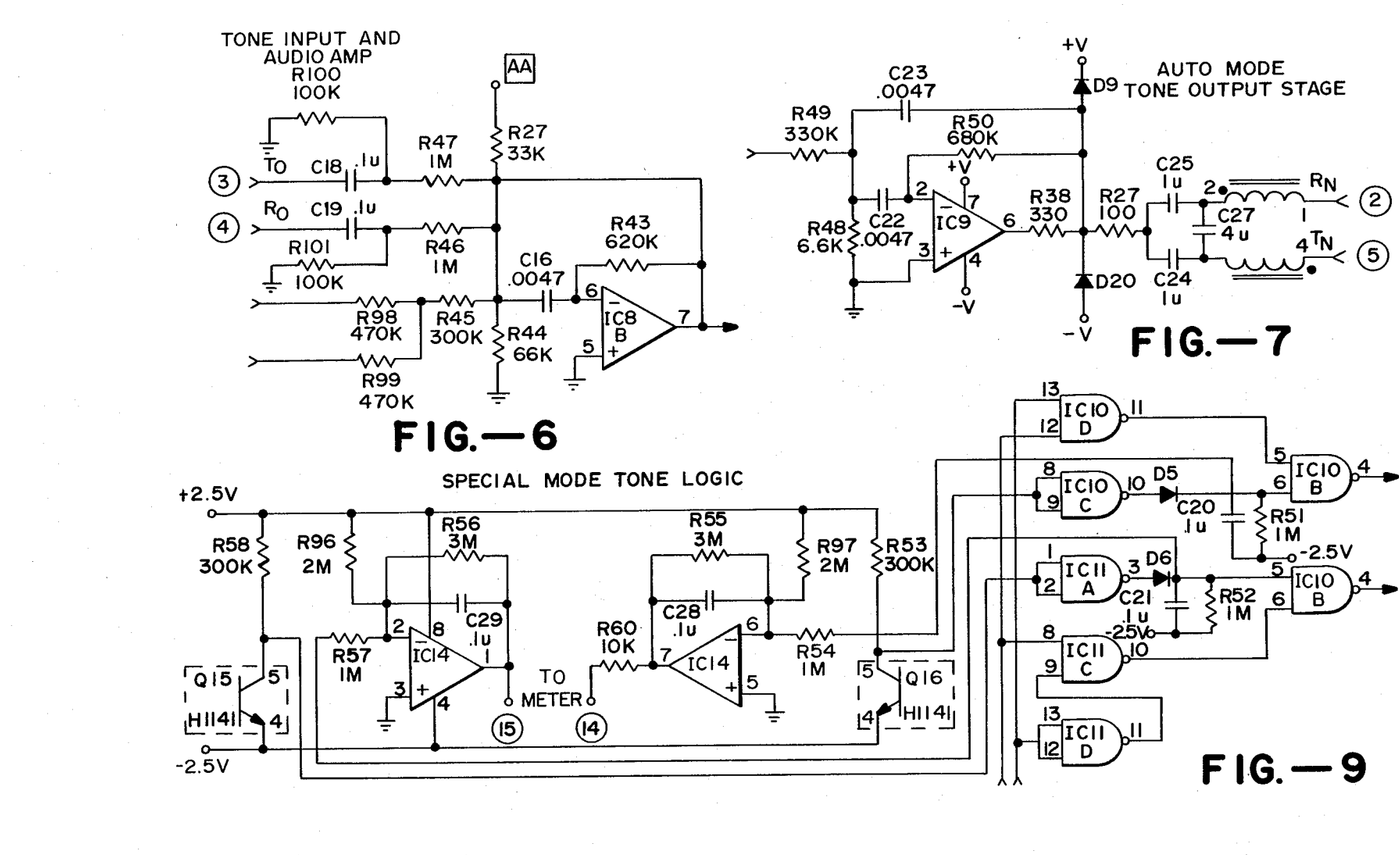
FIG. 6 depicts a schematic diagram of a tone input and audio amplifier circuit, which forms a portion of FIG. 2.
FIG. 7 depicts a schematic diagram of an auto mode tone output stage, which forms a portion of FIG. 2.
FIG. 9 depicts a schematic diagram of special mode tone logic, which forms a portion of FIG. 2.

Referring now to FIG. 6, the tone input and audio amplifier circuit 74 of FIG. 2 is depicted in schematic detail. In FIG. 6, the tone input and audio amplifier receives signals from a probe amplifier, from the special mode tone logic circuit 72 of FIG. 2 and directly from the telephone lines $T_O$, $R_O$. The tone input and audio amplifier 74 amplifies and filters these inputs for connection to the speaker amplifier 76 of FIG. 2.

Typically, only one of the three inputs to amplifiers circuit 74 of FIG. 6 is active or "on" at any one time. When signals are taken from phone lines $T_O$ $R_O$, resistors R100 and R101 and capacitors C18 and C19 prevent DC signals from being applied to the amplifier 150 input. The AC signals enter the amplifier by capacitors C18, C19 and resistors R47, R46.

When signals are taken from the special mode tone logic circuit 72 of FIG. 2, pulsating tone frequencies are connected from gating circuits IC10 and IC11 of FIG. 9 and are applied to amplifier 150 by the network formed by resistors R98, R99 and R45.

The output of tone input and audio amplifier circuit 74 is connected to speaker amplifier 76 of FIG. 2 which provides sufficient amplification for driving a conventional 16 ohm speaker in order that a craftsperson may audibly hear or register an indication of proper test connections.

Referring now to FIG. 7, the auto mode tone output stage 64 of FIG. 2 is depicted in schematic detail.

In FIG. 7, the controlled 500 Hz tone signal from auto mode control logic 62 is connected to amplifier 156 coupled through transformer circuit T1 to telephone lines $R_N$, $T_N$. Transformer TI and capacitor C27 prevent any differential signal from being applied to lines $R_N$, $T_N$; therefore the tone output is simplex.

Figure 8:
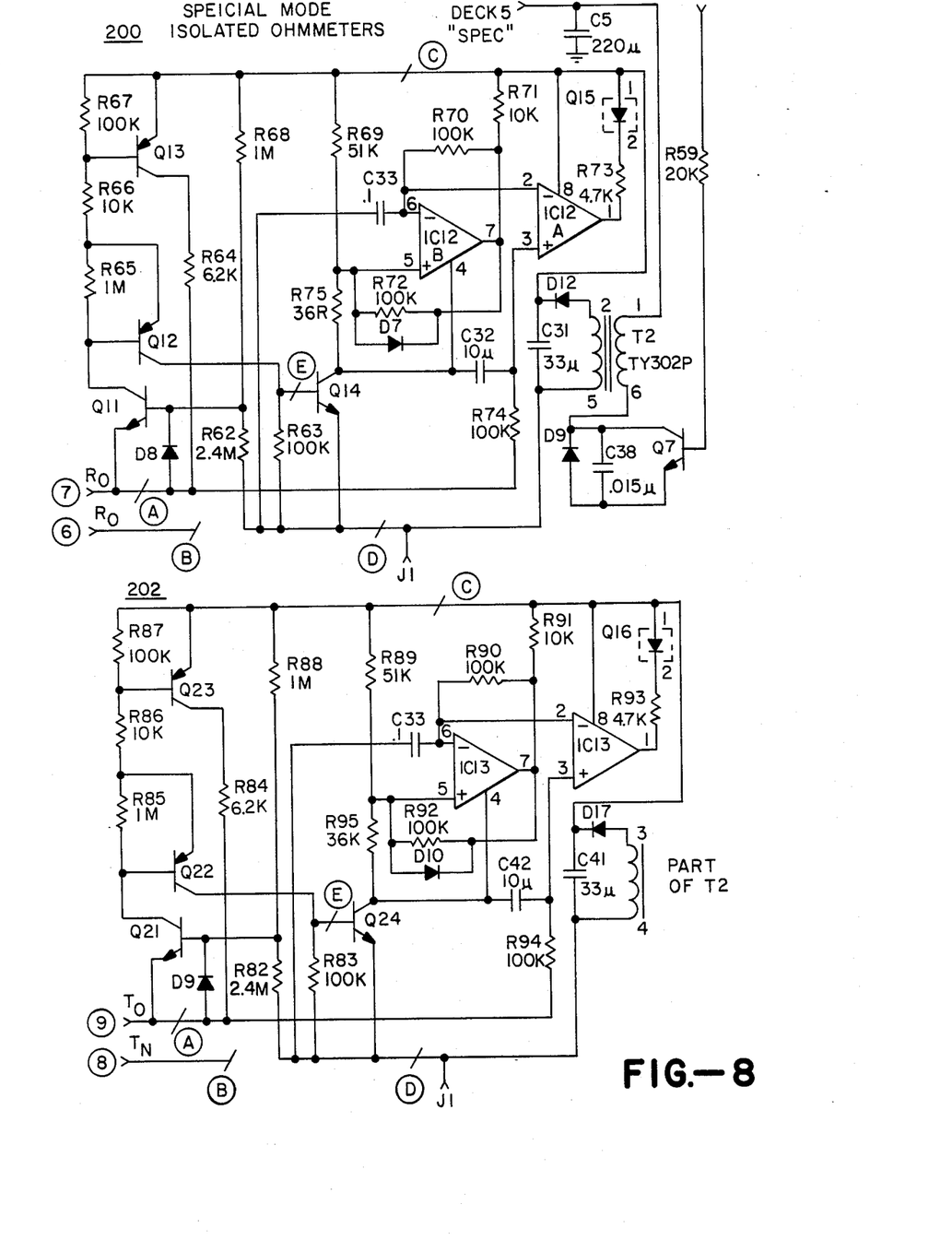
FIG. 8 depicts a schematic diagram of special mode isolated ohmmeters, which forms a portion of FIG. 2.

Referring now to FIG. 8, a schematic diagram of the special mode isolated ohmmeters 70 of FIG. 2 is depicted in schematic detail.

The auto mode portion of the present invention provides appropriate testing for plain old telephone service (POTS). However, there are circuits in use today known as "special circuits" which are in effect special purpose lines. Examples of special circuits are four-wire lines with separate send/receive pairs, pay telephone lines, and leased lines for special purposes, such as controlling power substations and other utilities. These special purpose line have varying degrees of accessibility. However, it is most important that any craftsperson not affect the operation of any of the special lines, such as inadvertent cutting or testing.

Accordingly, the present invention provides for "isolated" ohmmeters, with no reference to ground, so that there in turn is no disruption to the operation of these special circuits.

The ohmmeters depicted in FIG. 2 include a "ring" isolated ohmmeter 200 and a "tip" isolated ohmmeter 202. Power supplied to each circuit 200, 202 is isolated from ground through a transformer T2.

Oscillator/divider circuit 140 of FIG. 5 provides a ±2.5 volt (5 V-PP) square wave which biases transistor Q7 on and off through resistor R59. The collector of transistor Q7 is connected to the primary coil of transformer T2.

Transistor Q7 is biased on and off and produces a changing current in the primary coil which induces changing voltage in both secondary coils of T2.

In order to simplify the operation of the special mode isolated ohmmeters of FIG. 8, only the tip ohmmeter circuit of FIG. 8 is described in detail. However, it should be understood that the operation of the ring ohmmeter 200 will be essentially identical.

FIG. 8 illustrates telephone lines $T_N$, $T_O$ connected as an input to circuit 202.

Diode D11 rectifies the secondary transformer voltage from transformer T2 and provides voltage with capacitor C41 acting as a filter capacitor.

The tip circuit 202 essentially acts as an isolated ohmmeter and is designed to work only when the resistance introduced into the circuit (between $T_O$ and $T_N$) is approximately 5K ohms or less.

When the resistance placed between lines $T_N$, $T_O$ meets this requirement, transistors Q21, Q22, Q23 and Q24 turn on.

When this happens, amplifier IC13 is now allowed to operate because it gets its negative ground potential through transistor Q24.

With transistor Q23 conducting, resistor R84 and the external resistance (Rext) form a voltage divider. The voltage at this point is then introduced to pin 3 of IC13 through the charging of capacitor C42 through resistor R94. This part of IC13 is essentially a comparator with the voltage on pin 3 being the threshhold voltage.

On pin 2 is a triangular wave which is produced by the other part of IC13.

The voltage on pin 5 is placed there by a voltage divider formed by R91 and R92 in parallel with resistor R89 in series with resistor R95 (amounting to approximately ½ of the isolated supply voltage. Capacitor C43 begins to charge positively through R90 until it reaches the voltage on pin 5. When this happens the output of IC13 goes to the negative rail. When this happens the voltage on pin 5 is determined through diode D10, which is now biased into conduction, and R89. Capacitor C43 begins to discharge via R90 until it goes below the voltage on pin 5. The output on pin 7 is now positive so capacitor C43 now begins to charge positively again at pin 6. Thus an oscillating square wave is formed at IC13 pin 7 and an oscillating triangular wave is formed at IC13 pin 6.

The triangular wave is then fed into pin 2 of IC13 which acting as a comparator with the voltage on pin 3 and the triangular wave on pin 2 produces a series of pulses which turn on and off the LED in photocoupler Q16. Photocoupler Q16 is the interface of the tip ohmmeter circuit 202 to the special mode tone logic circuit 72 of FIG. 2.

FIG. 9 depicts the special mode tone logic which receives the photocoupler signal via transistor Q16.

In FIG. 9, pulses are fed from the Q16 collector to IC11 where the pulses are shaped and inverted and then connected to a peak riding detector.

Capacitor C21 charges to a positive potential and slowly begins to discharge. When another positive pulse comes to recharge capacitor C21, this voltage is fed back to IC14 which amplifies this voltage and is then fed to one side of the special meter 28 of FIG. 1.

Referring again to FIG. 9, with only the tip side engaged, the meter deflects to the ring side showing that it does not have the proper resistance at the ring input. When both the tip and ring lines are engaged, the meter will be zeroed in the middle because the meter will have an equal voltage on both sides so that there will be no current flow and therefore no deflection.

There will also be no deflection when both do not have the resistance connected.

When the peak riding detector of FIG. 9 is applying positive voltage to IC11, it enables IC11 to allow IC5 and IC6 to gate a 500 Hz ringing pulse to be amplified and output to a speaker, as previously described.

Figure 10:
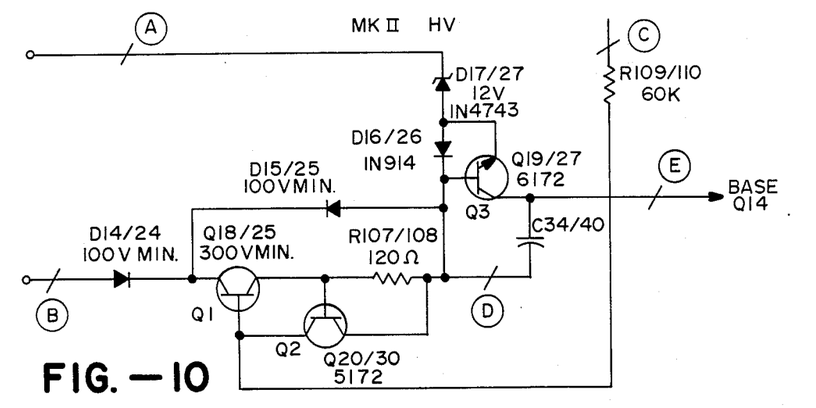
FIG. 10 depicts a schematic diagram of a high voltage protection circuit, which forms a portion of FIG. 8.

Referring now to FIG. 10, a high voltage protection circuit for use with the special mode isolated ohmmeters of FIG. 8 is depicted. The high voltage (HV) protection circuit will prevent false detection when large DC or AC signals are inadvertently applied to the input of the ohmmeter. The HV protection circuit gives an automatic indication to prevent such false detection. The HV protection circuit also prevents such signals from damaging the ohmmeter.

Referring now to FIGS. 11-14, there is illustrated therein the various meter indications and audible indications for proper operation of the invention.

As previously discussed, a 500 cycle simplex tone (inaudible to a subscriber) will be heard from an internal speaker if the pair is fault free and may be transferred. Adjustment of the volume control 32 of FIG. 1 to the lowest acceptable level will provide for extended battery life. In high noise areas, a standard head set (not shown) may be plugged into head set jack 24 of FIG. 1.

If the pair is a working line in use (busy) and may be transferred, a normal simplex tone will be heard and pairs can be transferred. If no tone is heard, then no cut should be made.

Figure 11:
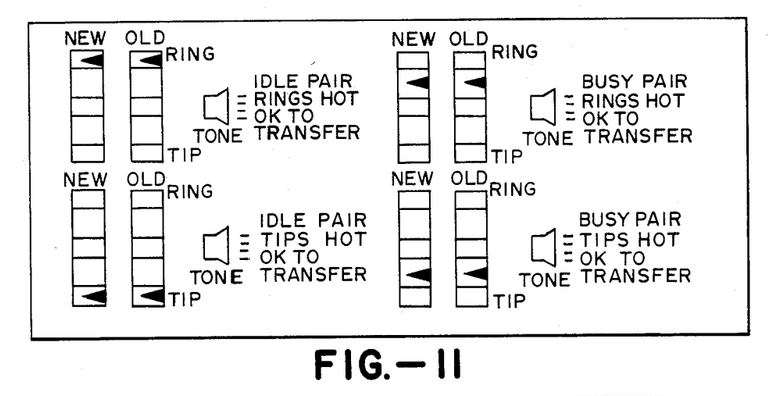
FIGS. 11-13 depict diagrams illustrating the operation of the test set depicted in FIG. 1.

FIG. 11 illustrates the "new" meter 28 of (FIG. 1) reading, the "old" meter 30 reading, and the tone connection in the auto mode of pairs that are good and can be transferred.

Figure 12:
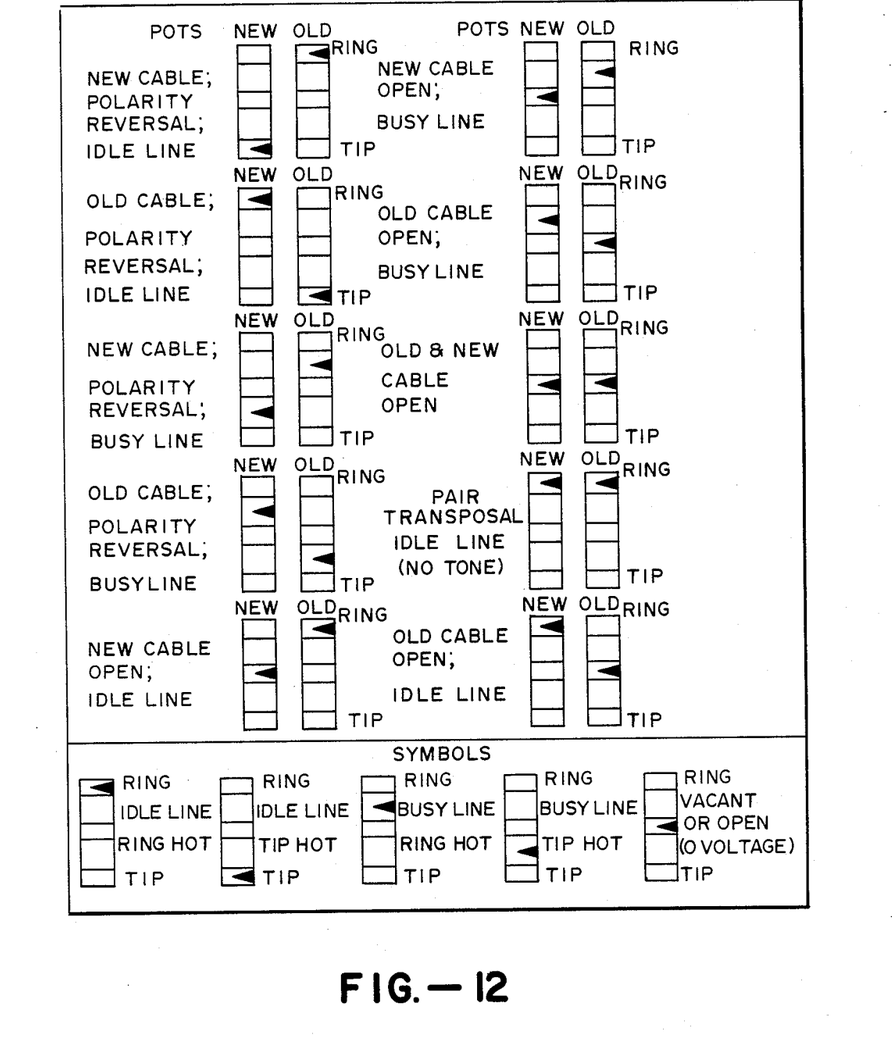

FIG. 12 illustrates the conditions if no tone is heard, and a craftsperson can observe the "new" meter 28 and the "old" meter 30 readings.

Figure 13:
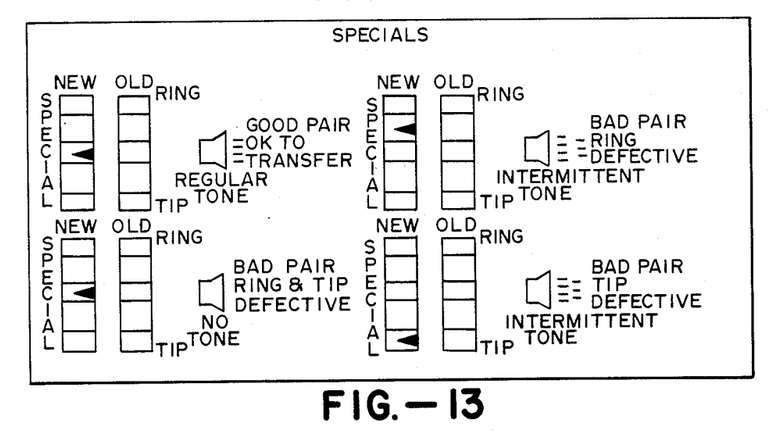

FIG. 13 illustrates meter and tone conditions of the "special" mode of operation.

If a pair is fault free, a normal 500 Hertz tone will be detected and the "new" meter's 28 needle will be centered in the zero voltage area of the scale.

If an intermittent 500 Hertz tone is detected, one side of the pair is defective. The craftsperson can observe the reading of the "new" meter at 28 which will indicate towards the ring or tip. This is the side of the pair that is defective.

If no tone is heard in the "special" function mode and the "new" meter 28 remains at center, then both sides of the pair are defective.

What is claimed is:

1. In a telephone system including a central office, a splicing test set for verifying connections between a first subscriber line pair connected to said central office and one or more second subscriber line pairs, each of said subscriber line pairs including tip and ring connections, said test set comprising:
    means for automatically and electronically verifying the connections between special circuit types of said first and said second subscriber line pairs,
    ohmmeter means for electrically isolating said first and second ring connections and said first and second tip connections,
    means for generating control signals representing the electrical resistance of said respective isolated connections, and
    means responsive to said control signals for indicating the measured resistances.

2. A splicing test set as in claim 1 further including:
    means for connecting the tip and ring connections of said second line pair to the respective tip and ring connections of said first line pair,
    means for loading the first line pair with a predetermined resistance such as not to signal an off-hook condition to said central office,
    means for electronically determining the correct connections of said second subscriber pair to said first pair and means for indicating said correct connections.

3. A test set as in claim 2 wherein said means for determining include means for measuring the loaded voltages at said first tip and said second ring connections and said second tip and said first ring connections, respectively, and
    means for comparing the measured voltages to determine the correct connections of said second subscriber pair.

4. A test set as in claim 3 wherein said means for determining include means for determining the polarity of said measured voltages to determine the correct polarity of said connections.

5. A test set as in claim 4 further including means for generating a test signal for transmission to said first and second pairs.

6. A test set as in claim 5 wherein said test signal is an audio test signal and including means for audibly registering said transmitted test signal.

7. A test set as in claim 1 including meter means for indicating said measured resistances.

8. A test set as in claim 1 including means for protecting said ohmmeter means from high voltages.

9. In a telephone system including a central office, a splicing test set comprising:
    a first line pair connection to said central office, said first pair including first tip and ring connections,
    a second subscriber line pair including second tip and ring connections,
    means for connecting the respective tip and ring connections,
    means for loading said first line pair with a predetermined resistance such as not to signal an off-hook condition to said central office,
    means for measuring the voltages at said first tip and said second ring connections and said second tip and said first ring connections, respectively,
    means for comparing the measured voltages to determine the correct connections of said respective tip and ring connections,
    means for determining the polarity of said measured voltages to determine the correct polarity of said respective conditions,
    means for generating an audio test signal for transmission to said first and second pairs,
    means for registering said transmitted test signal thereby indicating a correct connection of said second line pair,
    ohmmeter means for electrically isolating said first and second ring connections and said first and second tip connections for special circuit types of testing, means for generating control signals representing the electrical resistance of said respective connections, and
    meter means responsive to said control signals for indicating the measured resistances.

10. A splicinng test set comprising:
    first and second line pairs, each of said line pairs including tip and ring connections,
    means for connecting the tip and ring connections of said second line pair to the respective ring and tip connections of said first line pair,
    means for loading the first line pair with a predetermined resistance such as not to signal an off-hook condition,
    means for automatically and electronically determining the correct connections of said second subscriber pair to said first subscriber pair without interrupting subscriber service,
    ohmmeter means for electrically isolating said first and second ring connections and said first and second tip connections for special circuit types of testing, means for generating control signals representing the electrical resistance of said respective connections, and
    meter means responsive to said control signals for indicating the measured resistances.

11. A test set as in claim 10 further including a plurality of subscriber line pairs and module interface means for providing modular interfacing of said subscriber line pairs, and switch means for providing random selection of said first and said second line pairs.

12. A splicing test set comprising first and second line pairs, each of said line pairs including tip and ring connections, means for connecting the respective tip and ring connections, means for loading said first line pairs with a predetermined resistance such as not to signal an off-hook condition, electronic means for automatically determining the correct connections of said second pair to said first pair,
    ohmmeter means for electrically isolating said first and second ring connections and said first and second tip connections for special circuit types of testing, means for generating control signals representing the electrical resistance of said respective connections, and
    meter means responsive to said control signals for indicating the measured resistances.

13. In a telephone system including a central office, a splicing test set for automatically and electronically verifying connections between a first subscriber line pair connected to said central office and one or more second subscriber line pairs, each of said subscriber line pairs including tip and ring connections, said test set comprising:

ohmmeter means for electrically isolating said first and second ring connections and said first and second tip connections for special circuit types of testing, means for generating control signals representing the electrical resistance of said respective isolated connections, and means responsive to said control signals for indicating the measured resistances.

* * * * *